United States Patent [19]

Fendley

[11] Patent Number: 4,686,429

[45] Date of Patent: Aug. 11, 1987

[54] CRT COLOR CONVERGENCE MEASUREMENT

[75] Inventor: James R. Fendley, Arlington Heights, Ill.

[73] Assignee: Zenith Electronics Corporation, Glenview, Ill.

[21] Appl. No.: 808,302

[22] Filed: Dec. 11, 1985

[51] Int. Cl.[4] .......................... H01J 29/70; H04N 9/24

[52] U.S. Cl. .......................................... 315/368; 358/67; 358/69

[58] Field of Search ..................... 315/368; 358/67, 69

[56] References Cited

U.S. PATENT DOCUMENTS

| | | | |
|---|---|---|---|
| 4,220,897 | 9/1980 | Barten et al. | 315/368 |
| 4,291,256 | 9/1981 | Garwin | 315/368 |
| 4,316,211 | 2/1982 | Mackey et al. | 315/368 |
| 4,318,032 | 3/1982 | Kureha | 315/368 |
| 4,364,079 | 12/1982 | Pons | 315/368 |

FOREIGN PATENT DOCUMENTS

| | | | |
|---|---|---|---|
| 60-189395 | 9/1985 | Japan | 315/368 |

*Primary Examiner*—Theodore M. Blum
*Assistant Examiner*—David Cain
*Attorney, Agent, or Firm*—Cornelius J. O'Connor; Thomas E. Hill

[57] ABSTRACT

A computer controlled system for measuring convergence in a multi-electron beam color cathode ray tube (CRT) provides a high speed coarse search and fine search sequence for locating the position of incidence of the electron beams on the CRT's faceplate. The coarse search involves a binary, step-wise procedure wherein a first half of the CRT's faceplate is illuminated by the electron beams with the remaining half of the faceplate then subjected to a divide-by-two binary search procedure which continues with the remaining CRT area halved at each subsequent step until resolution of electron beam position is determined to within approximately 2 horizontal and vertical lines by a photodetector whereupon the fine search procedure is automatically initiated. The fine search procedure involves the electronic position stepping of line images upon a quadrant type or otherwise split photodetector. Defocusing of these colored line images causes an overlapping of the individual phosphor dot or pixel images on the detector, distributes the thus presented image over a greater area and smooths the blurred image, thus minimizing measurement errors arising from the discontinuous nature of the array of illuminated phosphor dots.

8 Claims, 14 Drawing Figures

CRT COLOR CONVERGENCE MEASUREMENT

BACKGROUND OF THE INVENTION

This invention relates generally to color cathode ray tubes (CRTs) and is particularly directed to the measurement of electron beam convergence in a multi-beam CRT.

CRTs such as those used in television receivers and computer terminals are generally provided with a plurality of luminescent elements deposited upon the inner surface of the CRT's faceplate upon which a video image is displayed. Impingement of energetic electrons upon the luminescent elements, which are commonly termed "phosphor dots", results in light output from these luminescent elements. Near simultaneous illumination of large numbers of phosphor dots in a predetermined array results in the display upon the CRT's faceplate of a desired alphanumeric character or graphic image. Positioned immediately adjacent to the faceplate and within the CRT is a structure generally termed a "shadow mask" having a large number of apertures therein through which the energetic electrons transit as they are directed toward impact with the phosphor dots. In a color CRT, wherein three electron guns are positioned in close proximity to one another in the neck or rear portion of the CRT, each aperture of the shadow mask corresponds with a trio of phosphor dots on the faceplate which respectively emit red, green and blue light, the primary colors, when struck by energetic electrons. Each aperture in the shadow mask is aligned with the three electron guns and the three associated, grouped phosphor dots to permit only electrons from the red electron gun to be incident upon red phosphor dots. Similarly, electrons from the green electron gun illuminate green phosphor dots, and the blue electron gun illuminates blue phosphor dots. In order to avoid deleterious moire effects, a scanning electron beam from any one of the three primary color guns must simultaneously illuminate several dots of the appropriate color. If the green gun (usually the center gun in an in-line configuration) illuminates red or blue dots a color contamination or loss of "purity" is said to result. Similar purity errors may occur with the other two primary colors. When the yoke and purity magnets on the neck are adjusted for proper purity, it often happens that another defect called misconvergence remains in portions of the display field. Misconvergence is a lateral displacement on the screen of the center of one of the three primary color beams with respect to the center of one of the other primary color beams. If, for example, the red and blue beams were misconverged, a desired magenta character "o" would appear as offset red and blue ovals. Using permanent magnets on the CRT neck, it is easy to obtain excellent convergence in the center of the display field. It is difficult, however, to obtain satisfactory convergence in all regions of a high resolution display. The objective measurement of convergence errors is the subject of the present invention.

Prior art methods of convergence measurement have involved cumbersome counting and identification of illuminated microscopic dots, or have required somewhat subjective adjustment of motion devices such as prisms for superimposing the misconverged primary color images. Electronic methods of convergence measurement can be found in U.S. Pat. No. 4,441,120 to Gerritsen. In this patent there is disclosed use of a quadrant-type photodetector for measuring the position of a line image. The Gerritsen method requires, however, one of the following somewhat objectionable techniques: precise mechanical adjustment of the split detector relative to a line image, or adjustment of synchronization timing signals to move the line image, or other deflection means to move the line image. The present invention avoids all of these troublesome techniques, using instead computer-controlled interaction between a split photodetector and the video signals of a bit-mapped or appropriate character-mapped display.

The present invention involves neither the physical displacement of the photosensitive detector nor the precise positioning upon the CRT's faceplate of either the photosensitive detector or the illuminated lines from which the convergence measurements are made. In accordance with the present invention, CRT color convergence measurements are made by means of a stationary, computer controlled quad detector capable of accurately detecting individual horizontal and vertical lines and of precisely measuring differences in position among the three lines representing the primary colors of red, green and blue. This measurement procedure eliminates inaccuracies arising from the staggered array of the phosphor dots on the CRT's faceplate as well as human errors involved in the positioning of the photosensitive detector and observing the relative positions of the various color lines.

OBJECTS OF THE INVENTION

Accordingly, it is an object of the present invention to provide for the more accurate measurement of electron beam convergence in a multi-electron beam CRT.

It is another object of the present invention to provide a computer-controlled, dual mode search procedure for locating and identifying the patterns illuminated on the faceplate of a CRT and for measuring the convergence of a plurality of electron beams incident upon the CRT's faceplate which form the thus illuminated patterns.

Yet another object of the present invention is to provide an arrangement for measuring electron beam convergence in a color CRT which eliminates measurement inaccuracies arising from the periodic array of phosphor dots or lines on the CRT's faceplate.

A further object of the present invention is to provide an electronic, computer-controlled arrangement for measuring color convergence in a multi-electron beam CRT display which eliminates the requirements of mechanical adjustment, human observation, or electron beam synchronization or deflection manipulation.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
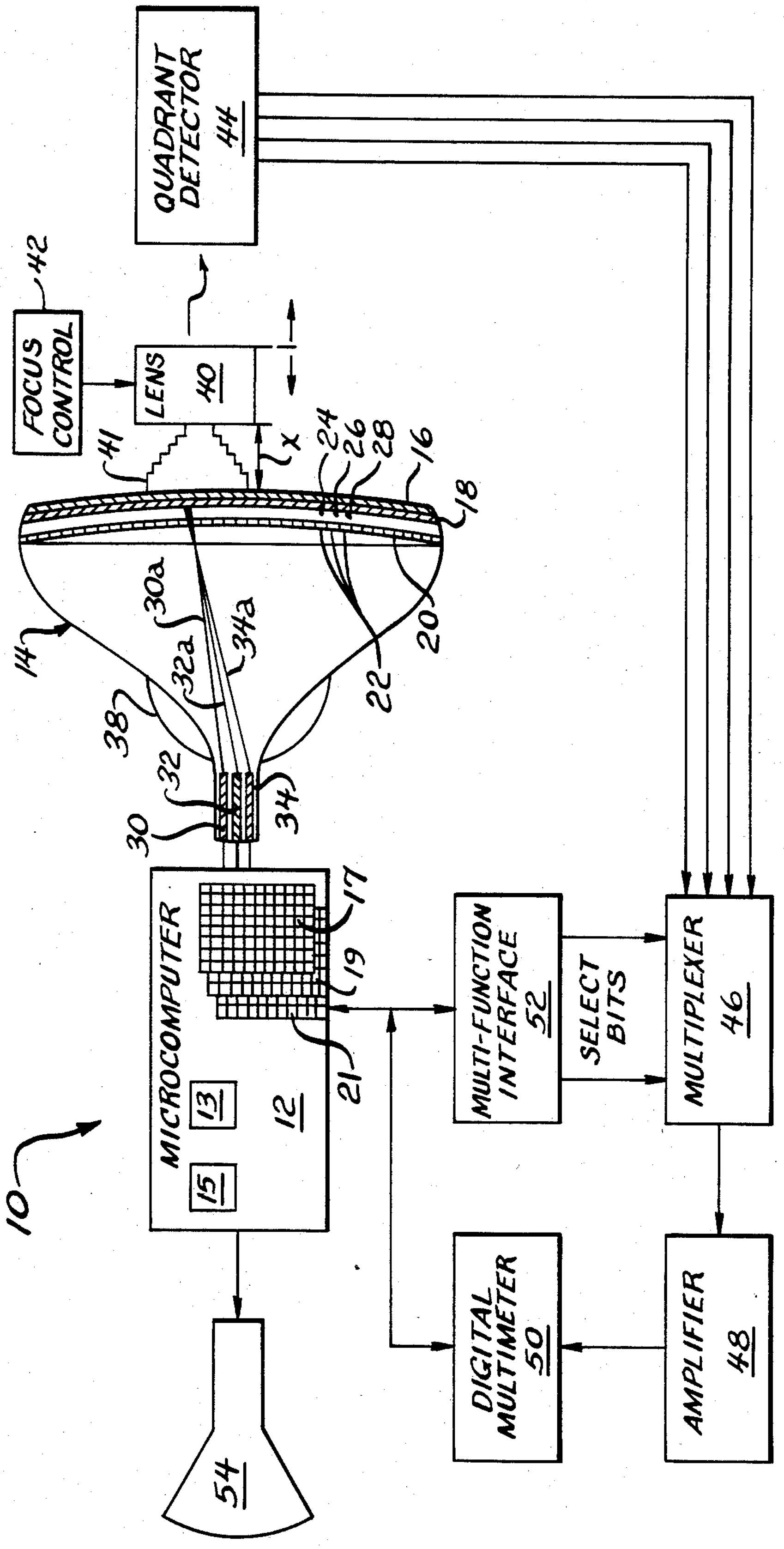
FIG. 1 is a simplified schematic and block diagram of a system for measuring electron beam convergence in a color CRT in accordance with the present invention.

Referring to FIG. 1, there is shown a simplified schematic and blook diagram of a convergence measurement system 10 for measuring the color convergence in a multi-electron beam cathode ray tube (CRT) 14 in accordance with the present invention.

The convergence measurement system 10 includes a microcomputer, which in a preferred embodiment is a Z-100 microcomputer available from Zenith Data Systems. The Z-100 is equipped with a Pickles and Trout Model P&T-488 interface card. This card permits control of instruments connected to a General Purpose Interface Bus (GPIB) following IEEE-488 standards. The microcomputer 12 includes, among other components, a central processor unit (CPU) 13, a read only memory (ROM) 15, and a program random access memory (RAM) 11. The CPU 13 includes an arithmetic-logic unit and a control section (not shown) which, in combination, execute various operating instructions, control the flow of data, make decisions based upon system tests and the detection of various system parameters, temporarily store data, and perform logic and arithmetic functions. The ROM 15 is used to store a dedicated program in firmware form and numbers or constants which are needed during execution of the aforementioned program. The program RAM 11 is a read/write memory which stores data for use during program execution and from which data may be read by the CPU 13 for processing therein as the microcomputer 12 exercises control over the convergence measurement system 10.

The microcomputer 12 is coupled to and controls first, second and third electron guns 30, 32 and 34 in the neck portion of the color CRT 14. In response to actuation of an electron source and various combinations of accelerating grids (not shown) within each of the electron guns by the microcomputer 12, the first, second and third electron guns 30, 32 and 34 respectively direct first, second and third electron beams **30*a*, 32*a* and 34*a* onto the inner surface of a faceplate 16 on a forward portion of the CRT 14. Positioned on the inner, aft surface of the faceplate 16 is a phosphor coating, or screen, 18 which is comprised of a plurality of phosphor dots, three of which are shown as elements 24, 26 and 28 in FIG. 1. The phosphor dots 24, 26 and 28 are arranged in groups of three and are each irradiated by a respective one of the aforementioned electron beams. Thus, for example, the red electron beam 30*a* is incident upon red phosphor dot 24 and nearby red phosphor dots, the green electron beam 32*a* is incident upon green phosphor dot 26 and nearby green dots, and the blue electron beam 34*a* is incident upon blue phosphor dot 28 and nearby blue dots. The trajectories of the electron beam and the characteristics of each of the phosphor dots are such that the impinging of a respective electron beam upon corresponding phosphor dots generates one of the primary colors, i.e., red, green or blue, due to the luminescent characteristics of the phosphor dots. Thus, for example, incidence of the first electron beam 30*a* upon the first phosphor dot 24 produces the color red, incidence of the second electron beam 32*a* upon the second phosphor dot 26 produces a green color, and incidence of the third electron beam 34*a* upon the third phosphor dot 28 produces the color blue. In this manner, the three primary colors and various mixtures thereof are visible upon the faceplate 16 of the CRT 14**.

Positioned within the CRT 14 immediately adjacent to and aft of the phosphor screen 18 on the faceplate 16 is a shadow mask 20. The three closely spaced electron guns 30, 32 and 34 produce beams that pass through holes or slits in the shadow mask 20 where the shadow mask is spaced apart from but close to the phosphor screen 18. The shadow mask 20 and the phosphor screen 18 are at the same voltage and the electrons thus travel in essentially straight lines. At the point where the electrons from one of the aforementioned electron guns are incident upon the phosphor screen 18, one of the color phosphors is deposited in the form of a spot or line which approximates the size of the aperture in the shadow mask 20 through which the electron beam passes. All undesired color portions of the phosphor screen 18 are in the "shadow" of the mask 20 insofar as the particular aforementioned electron gun is concerned. As the three electron beams **30*a*, 32*a* and 34*a* are deflected in unison by a plurality of magnetic deflection coils 38 positioned around an intermediate portion of the CRT 14, the three electron beams pass through common apertures in the shadow mask 20 and thus converge in the general plane of the phosphor screen. As is well known, the three electron beams 30*a*, 32*a* and 34*a* are displaced generally horizontally from left to right as the CRT 14 is viewed from the front and are periodically deflected downward and leftward in a horizontal retrace interval to allow the electron beams to raster scan the faceplate 16. The three electron beams are also deflected upward in unison periodically from the bottom of the CRT's faceplate 16 during a vertical retrace interval to the upper end portion of the faceplate whereupon the repetitive horizontal scanning of the faceplate by the three electron beams is re-initiated. While the present invention is disclosed in terms of use with a phosphor dot array on the CRT's faceplate in combination with a plurality of circular apertures in the shadow mask 20**, it is not limited to such an arrangement and is equally compatible with an in-line electron gun arrangement wherein the shadow mask includes a plurality of slit openings through which the electron beams transit and are incident upon a phosphor arrangement comprised of a plurality of elongated strips.

A plurality of picture elements associated with the aforementioned phosphor dots are arranged in generally linear arrays so as to form 225 vertically spaced horizontal rows and 640 horizontally spaced vertical columns. The thus arrayed 144,000 picture elements are mapped in a matrix array on a 1:1 basis in the microcomputer's video RAM 17 such that each picture element is represented by a corresponding location in the matrix memory of the microcomputer's video RAM 17. In the present case, the microcomputer 12 includes two additional video RAMs 19 and 21, with video RAM 17 containing red phosphor dot addresses, video RAM 19 containing green phosphor dot addresses, and video RAM 21 containing blue phosphor dot addresses for the color CRT 14. Such multi-plane color video RAM arrays are well known in the art. By virtue of the aforementioned 1:1 mapping arrangement of the phosphor dot groups in the microcomputer's video RAMs 17, 19 and 21, individual horizontal and vertical lines of phosphor dots may be illuminated by the magnetically deflected electron beams to permit the convergence of these electron beams to be measured at various points on the surface of the CRT's faceplate 16. Thus, a given combination of select horizontal and vertical lines may be designated for illumination upon the CRT's faceplate for measuring the convergence of the three electron beams as described below.

Positioned in front of the CRT's faceplate 16 is a lens 40 which transmits the image on the faceplate to a four element quadrant detector 44. Positioned between the lens 40 and the CRT's faceplate 16 is an extendable bellows 41 or other appropriate light shield. Coupled to the lens 40 is a focus control 42 which provides for the displacement of the lens 40 toward and away from the CRT's faceplate 16 as shown by the arrows in FIG. 1. Thus, as shown in FIG. 1, the lens 40 is positioned a distance of X from the CRT's faceplate, but may be displaced either leftward or rightward as shown in the figure by means of the focus control 42 with the extendable bellows 41 remaining positioned between the lens and the CRT's faceplate 16. By displacing the lens 40 transverse to the plane of the CRT's faceplate 16, the focus control 42 is able to defocus the video image of the lines displayed on the CRT's faceplate 16 for more accurate detection of line position thereon as described in the following paragraphs.

The quadrant detector 44 is positioned adjacent to and aligned with the lens 40 and is adapted to detect the defocused line image transmitted through the lens. Referring to FIGS. 2*a*–2*f*, there is shown a four element quadrant detector 44 used in a preferred embodiment of the convergence measurement system 10. Each of the four elements I, J, K and L of the detector 44 is responsive to light incident thereon, with the four elements separated by diagonal lines in the detector. The pie-shaped detecting elements within the detector are configured such that their sensitivity to incident light increases as the incident light is displaced further away from the detector's center. This is due to the increased detecting surfaces of each of these elements in proceeding outward from the detector center toward the periphery thereof. Photosensitive detectors embodying this principle are disclosed in U.S. Pat. No. 4,441,120 to Gerritsen discussed above.

Each of the four elements of the quadrant detector 44 is coupled by means of a respective conductor to a multiplexer 46. The multiplexer 46 is coupled to the microcomputer 12 by means of a multi-function interface unit 52. While four inputs corresponding to each of the four detecting elements are provided to the multiplexer 46 from the quadrant detector 44, only two inputs are provided to the multiplexer to the multi-function interface unit 52. The two inputs from the multi-function interface unit 52 to the multiplexer 46, which are under the control of the microcomputer 12 and are designated select bits, are used to select which of the four quadrants is to provide an input to the multiplexer 46 in detecting the location of either a vertical or a horizonal line on the CRT's faceplate 16. The two bit output from the multi-function interfac unit 52 to the multiplexer 46 provides for the selection of any one of the four detecting elements of the quadrant detector 44 since $2^2=4$. Only two detecting elements are used to determine the position of either a horizontal or a vertical line on the CRT's faceplate 16 as described in detail below, with the two cooperating detecting elements thus used positioned in facing relation relative to one another in the quadrant detector 44.

The output of the multiplexer 46 representing either a horizontal or vertical line detected by one of the detecting elements in the quadrant detector 44 is provided to a signal amplifier 48 for the amplification thereof and thence to a digital multimeter 50 which serves as an analog-to-digital converter in converting the analog output of the signal amplifier to a digital signal which is then provided to the microcomputer 12. The signal provided from the digital multimeter 50 to the microcomputer 12 is in digital form and provides an indication to the microcomputer of the detection and intensity of a line by one of the detecting elements in the quadrant detector 44. Information regarding which of the detecting elements is providing the sensed input via the multiplexer 46 is determined by the microcomputer 12 which provides the aforementioned select bits via the multi-function interface unit 52 to the multiplexer for designating which output from a given detecting element within the quadrant detector 44 is to be transmitted by the multiplexer. In a preferred embodiment of the present invention, the quadrant detector 44 is a United Detector Technology PIN-SPOT/9D quadrant detector, the multiplexer 46 is a CMOS multiplexer which serves as a solid state switch, the multi-function interface unit 52 is a Tektronix TM5006/MI5010/50M30 interface unit, the amplifier 48 is a United Detector Technology 101C transimpedance amplifier, and the digital multimeter 50 is a Hewlett Packard 3478A multimeter which functions as an analog-to-digital converter.

Referring again to FIGS. 2*a*–2*f*, there is shown a four element quadrant detector 44 used in a preferred embodiment of the present invention for detecting a display line on the CRT's faceplate 16. The quad detector 44 includes the aforementioned four detecting elements I, J, K, and L. Adjacent detecting elements are separated by a portion of a respective diagonal line which extends through the center of the quad detector 44. The configuration of this quad detector results in increased light incident upon a respective detecting element therein as the line is positioned further from the detector's sensor. This is a result of the "pie-shaped" configuration of each of the detecting elements which output a larger signal the further the detected line is from the detector's oenter. FIGS. 2*a*–2*f* illustrate the detection of the position of a horizontal line on the CRT's faceplate and make use of the upper and lower detecting elements I and K. Detection of the position of a vertical line would make use of detecting elements J and L and involves a procedure similar to that described herein.

Figure 2A:
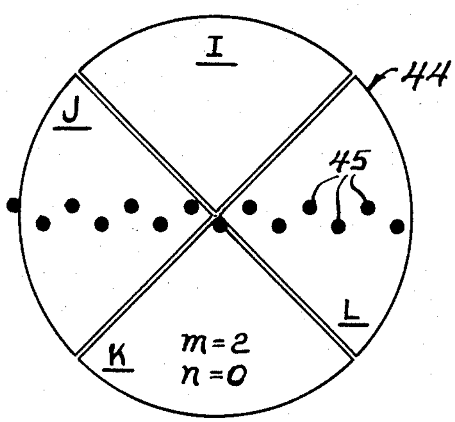
FIGS. 2*a*–2*f* illustrate the positions of phosphor dot images upon a quad detector as utilized in the present invention.
Figure 2B:
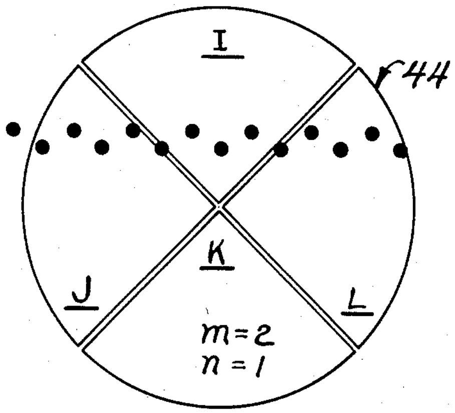

As shown in FIGS. 2*a* and 2*b*, each horizontal line is comprised of a plurality of phosphor dots or display elements 45 which are arranged in a nonlinear, staggered array across the CRT's faceplate. FIGS. 2*a* and 2*b* represent precise focusing of the lens 40 relative to the phosphor dots such that individual phosphor dots are readily visible. FIG. 2*a* illustrates the image of a scanning line in exact registry with the center, or cross hairs, of the quad detector 44. Because of discontinuous nature of this scanning line, it can be seen that the top and bottom detecting elements I, K will receive unequal amounts of light in spite of the perfect vertical registry of the scanning line. In the case of FIG. 2*a*, the bottom detector element K is illuminated, while the top detector element I is not illuminated. The difference signal output from the quad detector 44 will therefore incorrectly indicate that there is a vertical error or vertical misregistration in the position of the horizontal scan line. In FIG. 2*a*, m indicates the magnification where m=2 and n represents the vertical misregistration of the horizontal scan line incident upon the quad detector 44. The one vertical pixel (n=1) limiting case shown in FIG. 2*b* indicates that a slight lateral shift would significantly change the error signal.

Figure 2C:
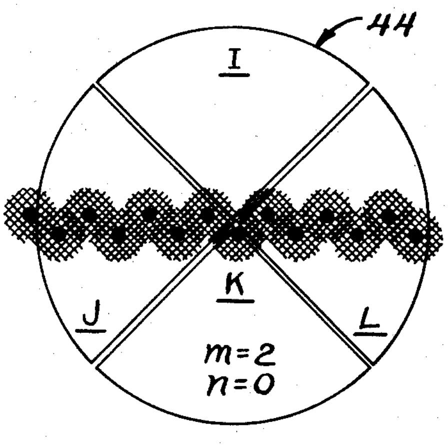
Figure 2D:
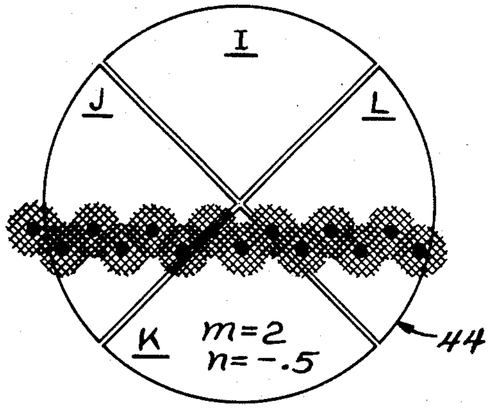
Figure 2E:
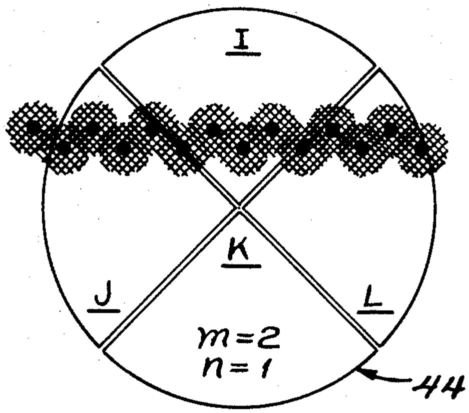
Figure 2F:
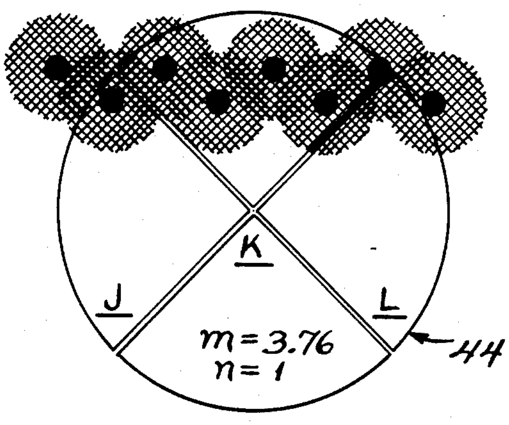

FIGS. 2*c*–2*f* represent the case where the horizontal scan line has been optically defocused which substantially improves measurement precision. FIG. 2*c* illustrates that image blurring provides an increased signal to the upper detecting element I, while reducing the difference between the signals provided to the upper and lower detecting elements resulting in a reduction in the false error signal inherent in the precisely focused image of FIG. 2*a*. FIG. 2*e* represents a defocused line image for the misaligned horizontal line of FIG. 2*b*. In comparing FIGS. 2*e* and 2*b*, it can be seen that FIG. 2*e* provides a more accurate representation of the position of the horizontal scan line relative to the center of the quad detector 44. FIG. 2*f* illustrates the situation where the horizontal line of phosphor dots has been further magnified, over the magnification shown in FIG. 2*e*. In FIG. 2*f*, the magnification is 3.76, while in FIG. 2*e* the magnification is 2.0. In comparing FIGS. 2*e* and 2*f*, it can be seen that the linearity between the upper and lower difference signals and the scanning line position is generally independent of the width of the scan line spread function thus indicating that the extent of optical defocusing is not critical, although excessive optical magnification may result in the blurring of the scan line beyond the linear range. For measuring horizontal convergence errors, the right and left difference signals are respectively provided by the right and left detector elements J and L to the multiplexer 46 under the control of the select bits provided thereto by the multi-function interface unit 52. Two adjacent horizontal pixels are illuminated in order to avoid a null situation in which neither the right nor the left detecting element is significantly illuminated.

Referring to FIGS. 3*a*–3*d*, there is shown a coarse search procedure utilized by the convergence measurement system 10 of the present invention. The purpose of this coarse search procedure is determination by the computer of the approximate field of view of the system photodetector 44. Any one of the four quadrants may be selected for implementation of this procedure. Suppose, for example, that the operator has placed the detector in such a position that a vertical line "X" on the display is imaged onto the selected quadrant whose position is shown by the circle in FIG. 3*a*. Various portions of the faceplate 16 are designated by letters A through H in FIGS. 3*a*–3*d*, with the manner in which these various portions are generated in carrying out the coarse search routine of the present invention described in the following paragraphs. While the following description is directed to detection of the position of a vertical line on the CRT's faceplate, a similar routine involving upper and lower portions of the faceplate would be implemented in detecting the precise location of a horizontal line on the faceplate 16.

Figure 3A:
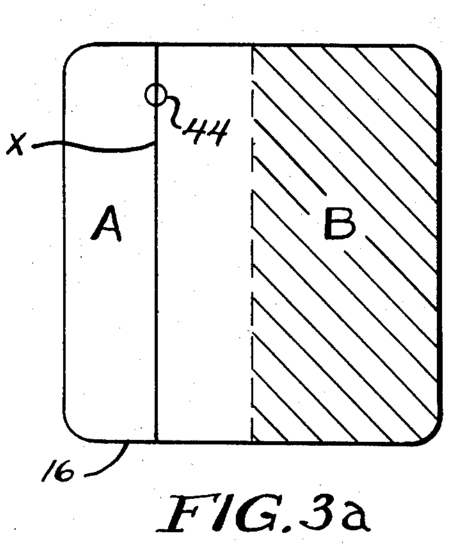
FIGS. 3*a*-3*d* illustrate the coarse search routine employed in the present invention in locating the position of the convergence detector on the faceplate of a CRT.
Figure 3B:
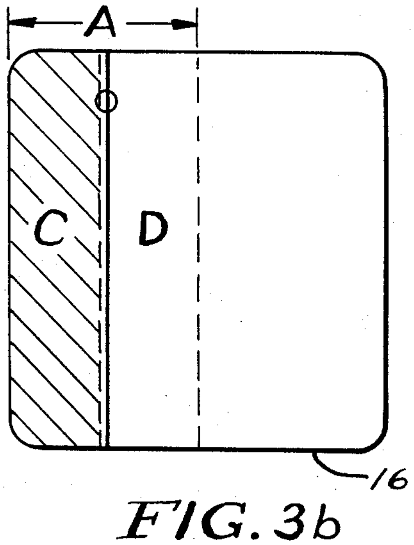
Figure 3C:
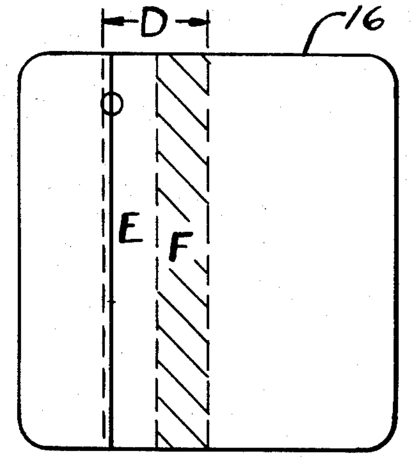
Figure 3D:
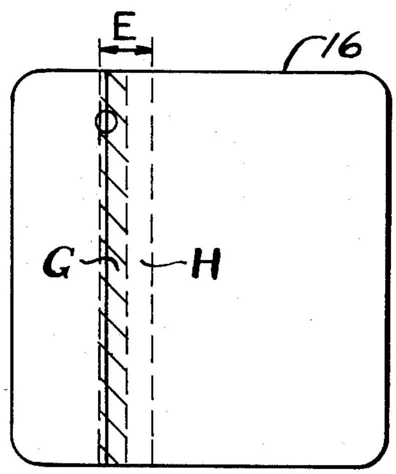

In detecting the position of a vertical line on the faceplate 16, the coarse search routine begins with the illumination in turn by the microcomputer 12 of each half of the CRT's faceplate. Right-half illumination is shown as the cross-hatched portion B of the CRT's faceplate 16. As shown in FIG. 3*a*, the microcomputer 12 determines that the detector 44 is positioned over that portion of the faceplate 16 designated "A". The next step in the coarse search procedure is the illumination of one-half of the area A as shown by the cross-hatched area C in FIG. 3*b*. From FIG. 3*b*, it can be seen that the detector 44 is in area D which represents one-quarter of the surface area of the faceplate 16. Since the microcomputer 12 controls which portions of the faceplate 16 are illuminated and since the detector 44 provides a feedback signal to the microcomputer, the microcomputer is able to determine by relative signal strengths that the detector is viewing the "D" region rather than the "C" region of the faceplate and is able to eliminate the remaining portions of the faceplate. As shown in FIG. 3*c*, the next step in the coarse seach procedure is the dividing of the area D in half so as to produce areas E and F which each represent one-eighth portions of the surface area of the faceplate 16. Illumination of region E provides a stronger signal than does illumination of region F. Further refinement in the coarse detection of the position of the detector 44 involves the dividing of the area E in half into areas G and H followed by illumination of each of these areas and a determination by the microcomputer that the detector 44 is in region G. This procedure continues until the location of the detector 44 is determined to within two of the possible 640 vertical lines. The coarse search routine is therefore of a binary nature and results, at each step, in the exclusion of half of the remaining picture elements from consideration in determining the location of the detector in finding the approximate location of the detector to within two horizontal pixels on the CRT's faceplate.

A similar coarse search routine would be followed in determining the approximate location of the detector in terms of its horizontal line location by dividing up the surface area of the faceplate 16 into horizontally aligned sections and dividing each section in half at each subsequent detection step so as to exclude half of the remaining picture elements from consideration. In the present invention, the relative order in which the position of the detector is determined with respect to the horizontal and vertical lines is immaterial, as the coarse search procedure may be applied first to either the horizontal or vertical lines and then to the remaining, transverse lines. In any case, the program stored within the microcomputer's ROM 15 terminates the coarse search procedure when the location of the detector 44 has been determined to within one vertical and two horizontal pixels on the CRT's faceplate 16. In accordance with the present invention, the coarse search routine described above is performed for a vertical line on the CRT's faceplate formed by one of the three electron beams incident thereon, followed by a coarse search for an intercepting horizontal line similarly formed by one of the three aforementioned electron beams. This order of coarse search may, of course, be reversed as indicated above. Following the determination of the position of the detector to within a resolution of about 2 horizontal and vertical pixels, the microcomputer 12 initiates a fine search routine which is described in the following paragraphs.

Figure 4:
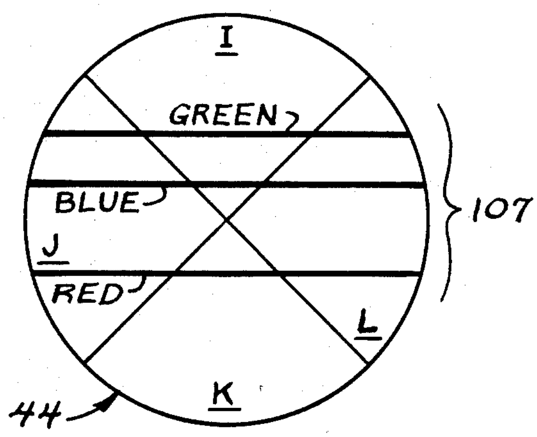
FIG. 4 is a simplified schematic diagram of a quad detector as utilized in a preferred embodiment of the present invention wherein the displacement between, or misconvergence, of the red, green and blue lines is illustrated.

Shown in FIG. 4 is the quad detector 44 which includes detecting elements I, J, K and L which are separated by respective portions of diagonal lines in the quad detector. On the CRT's faceplate the electron beams sequentially trace out each horizontal scan line in proceeding from top to bottom. The relative orientation of the horizontal scan lines is shown reversed in FIGS. 4 and 5 due to the image inversion caused by lens 40. In FIG. 4, there is shown a hypothetical programmed white horizontal line number 107. From FIGS. 4 and 5, it can be seen that not only are all three primary color components of line 107 in mutual misregistration, but also none of the primary color lines are positioned on the cross hairs, or the center, of the quad detector 44.

Figure 5:
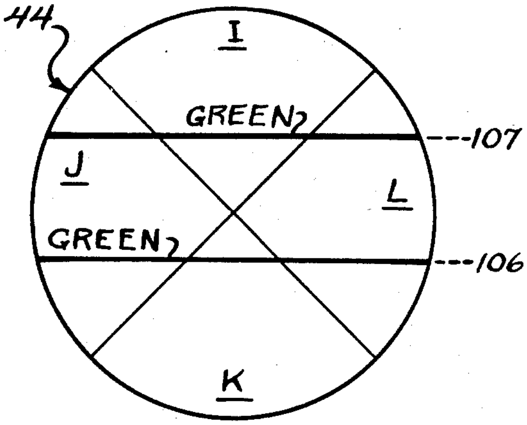
FIG. 5 shows the quad detector of FIG. 4 wherein the relative positions of two adjacent horizontal scan lines are illustrated for use in the step-wise fine search routine in precisely locating a given horizontal or vertical line.

The relative positions of the primary color component lines are determined in the following manner using the upper and lower detecting elements I and K as shown in FIG. 5 which illustrates the relative positions of two adjacent green horizontal scans. Under the oontrol of the microcomputer 12, the number of the horizontal scan line is incrementally increased or decreased depending on the relative magnitudes of the signals received by the upper and lower detecting elements I and K. The $|I|-|K|$ error signal is positive if the line image is mostly in quadrant I. Otherwise, this error signal is zero or negative. For the case of the green component line 107, the computer displaces the green component line image downward one line at a time and looks for a sign change in the difference or error signal calculated from the separate quadrant I and quadrant K readings. In the example of FIG. 5, the sign change occurs between line 106 and line 107. The computer needs to record only the current and previous error signal results. Upon detection of the sign change, a linear interpolation procedure allows calculation of the effective green vertical pixel number corresponding to the quad detector center. With green line images shown in FIG. 5, one may readily estimate an interpolated pixel number of about 106.4. Similarly, one may determine a red interpolated pixel number 107.5, and a blue interpolated pixel number 106.7. With prior knowledge that the vertical pixel spacing is, say 0.8 millimeter, one may readily calculate vertical misconvergence with respect to green and obtain the following results: Red error with respect to green (on the display) 0.88 mm high, and blue error with respect to green 0.24 mm high. In like manner, one may use prior knowledge of the horizontal pixel spacing, and interpolated horizontal pixel numbers for the primary colors, to obtain horizontal convergence results. Thus, as shown in the examples of FIGS. 4 and 5, the quad detector need not be centered on a given horizontal or vertical line to provide precise convergence measurements since the present invention is capable of accurately determining not only the relative positions of the individual primary color lines, but also the location of the composite color line on the video display's faceplate.

Figure 6:
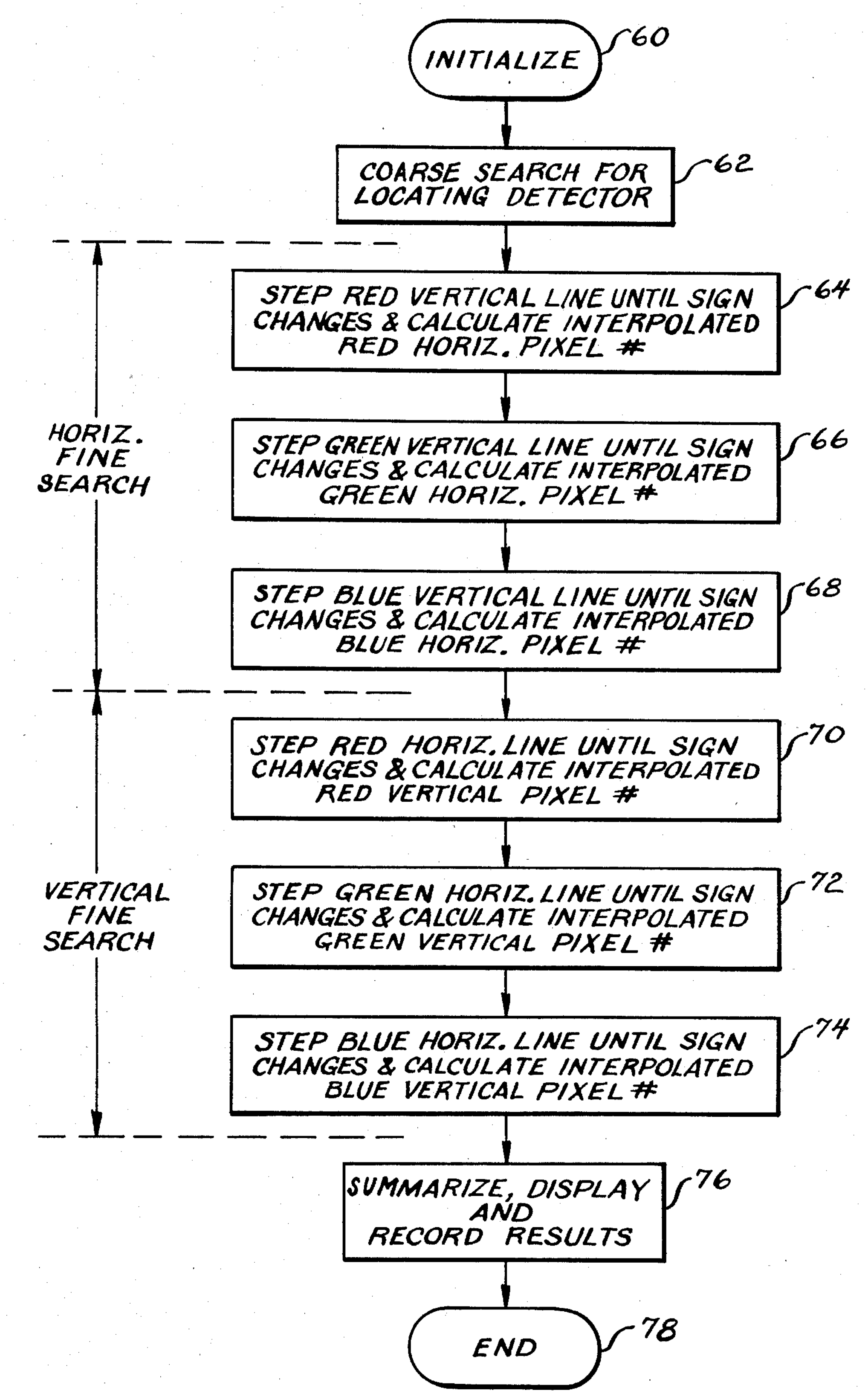
FIG. 6 is a flow chart illustrating the sequence of operations carried out under the control of a microcomputer in measuring electron beam convergence in a color CRT in accordance with the principles of the present invention.

Referring to FIG. 6, there is shown a flow chart illustrating the sequence of operations carried out by the microcomputer 12 in accordance with the program stored in its program RAM 11. The operating program is initialized at step 60. This is followed at step 62 by the coarse search routine described above wherein the CRT's faceplate is divided into two equal areas with one of the areas illuminated by the electron beams and the remaining portion remaining unilluminated, which process is carried out in a step-wise manner with each successive surface area portion of the CRT's faceplate divided in half and eliminated as including the detector's position until the detector is located to within a few horizontal and vertical lines on the CRT's faceplate. Following this coarse search routine, the fine search routine is initiated at step 64 with the microcomputer incrementally stepping the red color component line either left or right until a signal sign change indicates that the red color component line has passed the center of the detector permitting the microcomputer to determine between which red horizontal pixels the quadrant detector center is positioned. This procedure is repeated for the green and blue color component lines at steps 66 and 68, which is followed by a similar procedure involving the top and bottom detecting elements of the detector in precisely locating, in sequence, the red, green and blue horizontal lines illuminated on the CRT's faceplate at steps 70, 72 and 74. Following completion of the fine search routine at step 74, the program stored in the microcomputer's program RAM 11 then summarizes the various aforementioned measurements and displays and records the results at step 76. Finally, the program ends at step 78.

There has thus been shown a computer controlled system for measuring color convergence in a multi-electron beam color CRT which makes use of a binary coarse search routine and an electronic stepping fine search routine for precisely locating the position of a detector on the CRT's faceplate. With the location of the detector determined to well within a single horizontal and vertical line on the CRT's faceplate, the convergence of the three electron beams in terms of the horizontal and vertical displacement therebetween is then precisely measured.

The present invention may thus be embodied in other specific forms without departing from the spirit or essential characteristics thereof. For example, while the present invention has been disclosed in terms of a sequential digital computation approach in measuring electron beam convergence error signals, it is not limited to this approach and will operate equally as well using analog difference signal detection techniques. Similarly, while the present invention has been described in its use with color CRTs having a dot or line arrangement of phosphor elements thereon, it has proven equally effective in measuring electron beam convergence in a patternless CRT having a continuous layer of luminescent material on its faceplate. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. In a color CRT wherein a plurality of electron guns each direct a respective electron beam onto a plurality of discrete luminescent elements positioned in an ordered array on a faceplate in producing video images thereon, a system for measuring the convergence of said electron beams on the faceplate comprising:

control means coupled to each of said electron guns for directing the plurality of electron beams onto the faceplate in timed sequence so as to produce a plurality of images in the form of lines or other patterns thereon;

a lens positioned adjacent to and forward of the CRT's faceplate for receiving and transmitting the plurality of images displayed on the faceplate;

detecting means aligned with said lens for receiving said images transmitted by said lens, for detecting the relative positions of each of said line or other pattern images, and for generating a plurality of signals each representing the position of one of said images on the CRT's faceplate, said detecting means including a quadrant detector having first and second pairs of facing detecting elements, wherein said first pair of facing detecting elements detects the relative positions of generally vertically oriented images on the faceplate and the second pair of facing detecting elements detects the relative positions of generally horizontally oriented images on the faceplate; and a multiplexer coupled to said quadrant detector and to said control means and responsive to a select signal from said control means for providing a plurality of detection signals output by said detecting elements to said control means in a paired, sequential manner.

2. The system of claim 1 further comprising a focus control coupled to said lens for defocusing images displayed on the faceplate whereby the discrete luminescent elements form a plurality of overlapping images and said images appear to be continuous on the faceplate.

3. The system of claim 2 wherein said focus control defocuses said images by changing the displacement between the faceplate and said lens, said system further including an extendible bellows or other suitable ambient light shield positioned between the CRT's faceplate and said lens.

4. The system of claim 1 wherein said detecting means is further coupled to said control means for providing said plurality of signals representing the positions of said images on the CRT's faceplate to said control means for processing therein

5. The system of claim 4 further comprising video display means coupled to said control means for providing a video presentation of the convergence of the electron beams on the CRT's faceplate.

6. The system of claim 1 wherein said control means first actuates the electron guns so as to illuminate $\frac{1}{2}$ portions of the faceplate in a step-like coarse search routine for locating the position of said detector on the faceplate wherein $\frac{1}{2}$ of a remaining portion of the faceplate is eliminated as including the location of said detector at each step of said coarse search routine.

7. The system of claim 6 wherein said coarse search routine is followed by a fine search routine involving a comparison of the magnitude of detection signals from one of said pairs of said facing detecting elements for determining the location of the closest vertically or horizontally oriented images on the faceplate to the location of the quadrant detector thereon.

8. The system of claim 7 wherein said control means includes a plurality of matrix memory banks each having a plurality of adressable locations representing on a 1:1 basis corresponding locations on the faceplate for controlling the position of incidence of a respective electron beam and the position of the image thus produced on the faceplate.

* * * * *